Patented Jan. 20, 1942

2,270,478

UNITED STATES PATENT OFFICE 2,270,478

AZO DYESTUFFS

Max Schmid, Riehen, near Basel, Switzerland, assignor to the firm Society of Chemical Industry in Basle, Basel, Switzerland No Drawing. Application February 19, 1940, Serial No. 319,809. In Switzerland October 3, 1936

8 Claims. (Cl. 260—153)

This application is a continuation-in-part of my application for patent Serial No. 166,021, filed in U. S. A. on September 27, 1937, and in Switzerland on October 3, 1936.

According to this invention valuable azo-dyestuffs are obtained by causing a diazo-compound of the benzene and naphthalene series which contains in ortho-position to the diazo-group a substituent which is capable of forming stable lakes with the azo-group formed, such as an ortho-hydroxy or ortho-carboxy-diazo compound to react with a 1-aryl-5-pyrazolone which itself is obtainable by condensation of a β-carbonyl-carboxylic acid ester with a hydrazine of the general formula

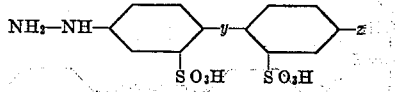

in which $y$ represents a —CH=CH—group or a —CH$_2$—CH$_2$—group and $z$ represents a group which is formed by reduction of a nitro-group in combination with a condensation, such as an azo- or azoxy-group or an amino-group substituted by the residue of an organic acid. The new azo-dyestuffs thus obtained are distinguished by their affinity for vegetable fibres, such as cotton, flax, ramie, and for fibres of regenerated cellulose, such as rayons, for example viscose rayon or cuprammonium rayon and by the capability of the dyeings thus obtained being after-treated with agents yielding metal, whereby their fastness properties, particularly their fastness to light and in certain cases also their fastness to washing may be improved considerably.

Among the ortho-hydroxy and ortho-carboxy-diazo compounds which come into consideration for the preparation of the azo-dyestuffs forming the parent materials of the invention there may be named quite generally those derived from ortho-aminophenols or ortho-aminonaphthols or from ortho-aminocarboxylic acids of the benzene or naphthalene series, for example 1-hydroxy-2-aminobenzene, 1-hydroxy-2-amino-4-chlorbenzene, 1-hydroxy-2-amino-4-nitrobenzene, 1-hydroxy-2-amino-5-nitrobenzene, 1-hydroxy-2-amino-4:6-dinitro-benzene, 1-hydroxy-2-amino-5-nitro-6-chlorbenzene, 1-hydroxy-2-amino-4-methyl-benzene, 1-hydroxy-2-amino-4-nitro-6-chlorbenzene, 1-hydroxy-2-amino-4-nitrobenzene-6-sulfonic acid, 1-hydroxy-2-amino-6-nitrobenzene-4-sulfonic acid, 1-hydroxy-2-aminobenzene-4-sulfamide, 1-hydroxy-2-aminonaphthalene-4:8-disulfonic acid, 2-hydroxy-1-amino-naphthalene-4-sulfonic acid, 2-hydroxy-1-amino-6-nitronaphthalene-4-sulfonic acid, 1-aminobenzene-2-carboxylic acid, 1-amino-4-chlorbenzene-2-carboxylic acid, 1-amino-4-nitrobenzene-2-carboxylic acid, 1-amino-4-benzoylamino-2-carboxylic acid, 4-amino-3-carboxylic-azobenzene-4'-sulfonic acid, aminosulfobenzoic acid (NH$_2$:1, COOH:2, SO$_3$H:4), 2-aminonaphthalene-3-carboxylic acid, and so on.

Among the β-carbonyl-carboxylic acid esters available for preparing the 1-aryl-5-pyrazolones which can be used for the synthesis of the parent dyestuffs there may be named formyl acetic acid esters, furthermore β-keto-carboxylic acid esters, such as ethyl-aceto-acetate, ethyloxal acetate, ethylbenzoylacetate, terephthaloyldi-acetic acid ethyl ester, and so on. Among the hydrazines which likewise are used for preparing the 1-aryl-5-pyrazolones used for the synthesis of the parent dyestuffs there may be named such products as:

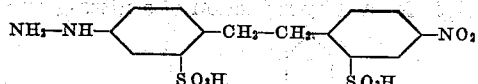

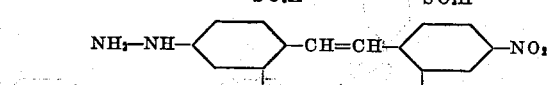

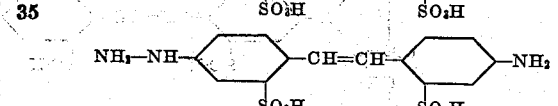

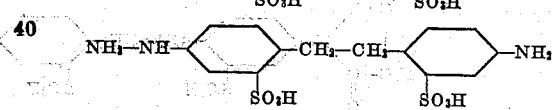

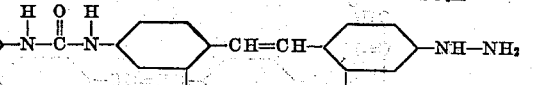

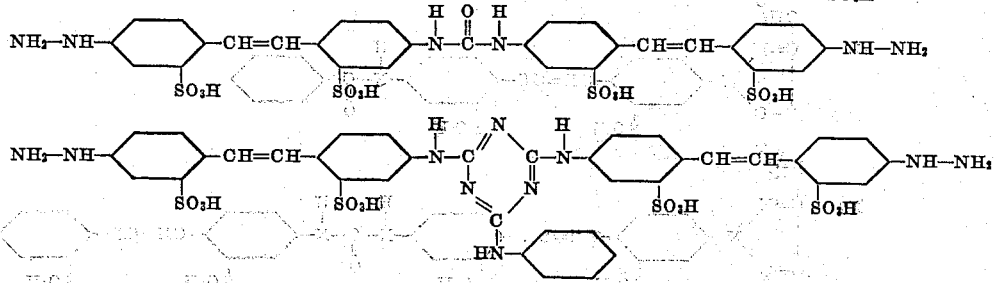

Quite generally, however, it is more advantageous first to combine the nitrohydrazine or the aminohydrazine with one of the aforesaid β-carbonyl-carboxylic acid esters and then to conduct the reduction of the nitro-group in combination with a condensation reaction.

This operation may consist in complete reduction of the nitro-group to the NH₂-group and subsequent condensation, for example with a halogen compound which converts the NH₂-group into a

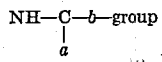

in which $a$ stands for metalloid whose atomic weight is not less than 14 and not greater than 16, and $b$ stands for an organic residue of the aliphatic, aromatic, cycloaliphatic, heterocyclic, araliphatic series and so on. Such products constitute acyl derivatives or the amidines which chemically are closely related thereto. As is known, the introduction of such residues into intermediate products or dyestuffs increase the affinity for vegetable fibre. Such residues can be introduced by acylation, for example by treatment with benzoyl chloride, phenylacetyl chloride, cinnamyl chloride, succinyl chloride, butyryl chloride, hexahydrobenzoyl chloride, furane-carboxylic acid chloride, benzimino ether, by treatment with phosgene or thiophosgene or by treatment with heterocyclic products of the nature of amidine halides, such as cyanuric acid chloride, cyanuric acid bromide, tribromopyrimidine, 2:6-dichloro-4-methylpyridine, dichloroquinazoline, and so on.

Particularly valuable products result when the condensation is conducted in such a manner that the residue $b$ is so constituted that it contains an azochromophore or is adapted to couple with diazo compounds to produce azo-dyestuffs. There are thus obtained 1-aryl-5-pyrazolones in which the aryl residue has the general formula:

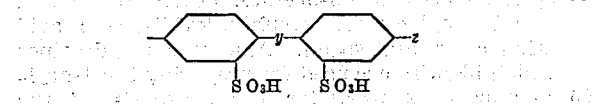

in which $y$ stands for a —CH=CH— or a —CH₂—CH₂—group and $z$ stands for a group which is formed by reduction of a nitro-group in combination with a condensation. Such pyrazolone derivatives are, for example:

(1) 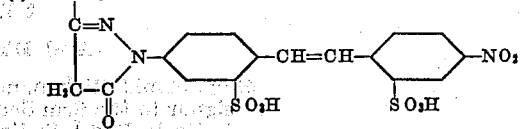

(2) 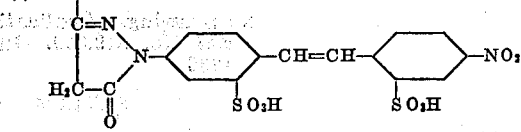

(3) 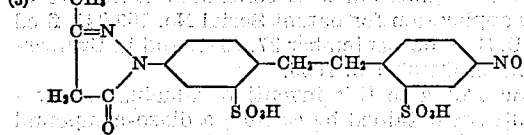

(4) 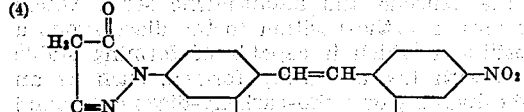

(5) 

(6) 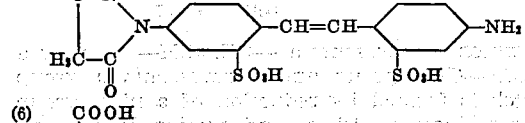

(7) 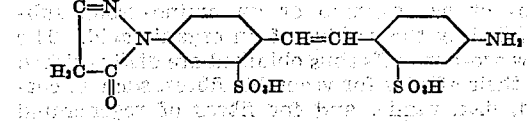

(8) 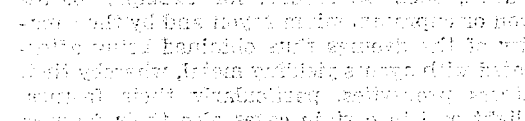

(9) 

(10) 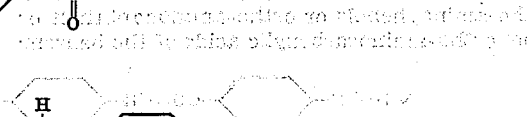

(11) 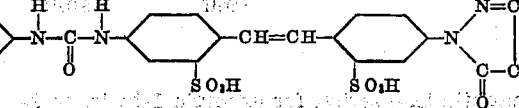

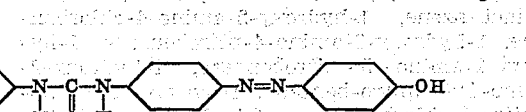

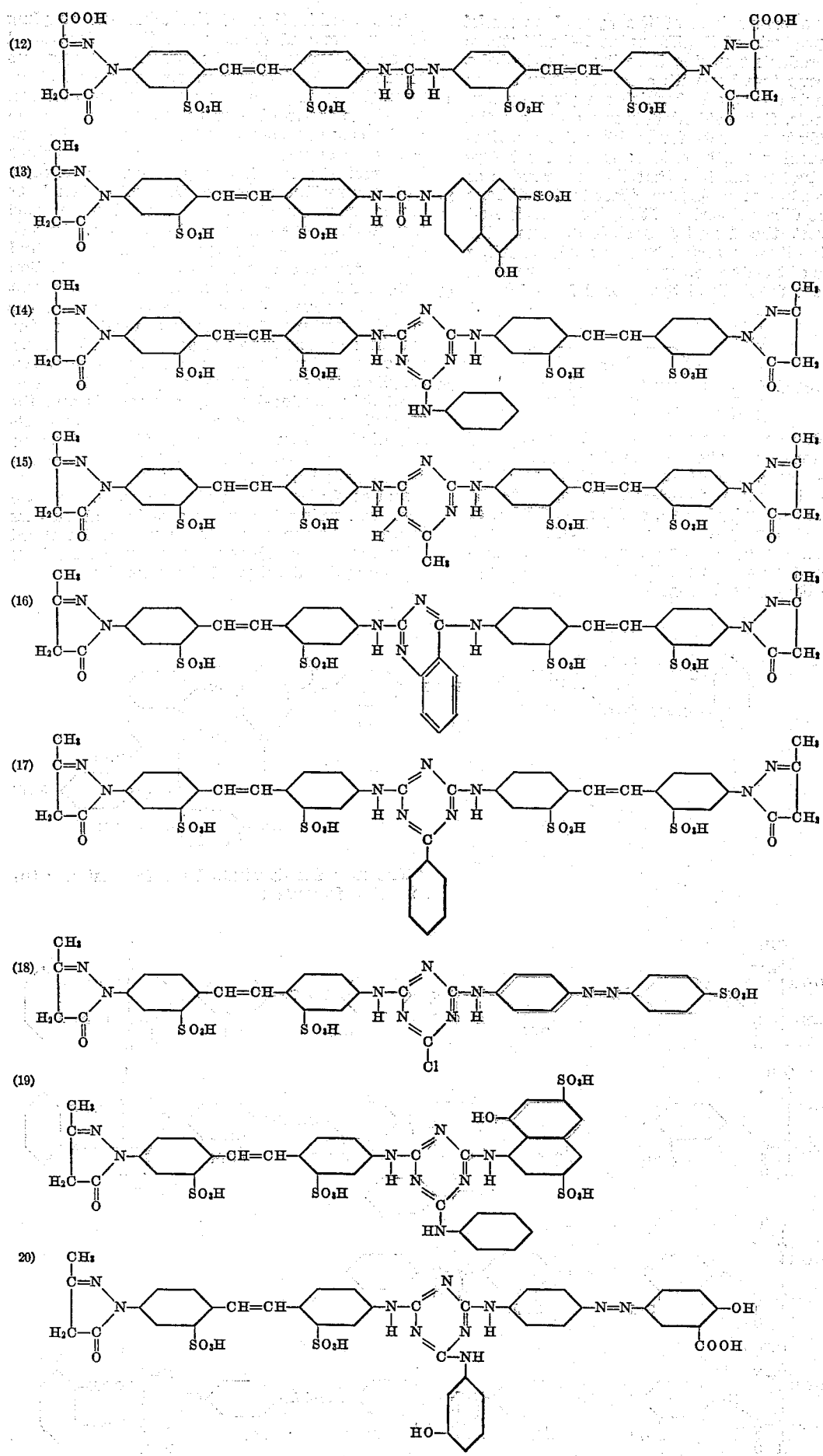

From a comparison of the pyrazolone nuclei of the products of the Formulae 1-7 with those of the products resulting from the reduction of a nitro-group together with a condensation shown in Formulae 5-20, all of which are given by way of example, it is evident how numerous are the intermediate products for making the azo-dyestuffs forming the invention; regard must further be had to the fact that the aryl residue of the pyrazolones may belong either to the stilbene or to the dibenzyl series. It is also possible first to convert the 1-aryl-5-pyrazolones from the aforesaid nitro- or amino-hydrazines by coupling with one of the diazo compounds already referred to into azo-dyestuffs of the general formula:

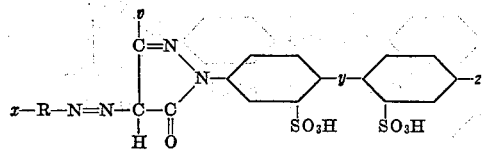

in which R stands for an aromatic nucleus of the benzene or naphthalene series, $x$ stands for an OH— or a COOH—group which stands in ortho-position to the —N=N—group, $v$ stands, for instance, for hydrogen, alkyl, aryl, COOH or COOR' (R'=alkyl), $y$ for a CH=CH— or a $CH_2$—$CH_2$—group, and $z$ for a $NO_2$— or $NH_2$—group, and then to proceed with the conversion of the nitro- or amino-group.

The combination of the aforesaid coupling components and diazotized ortho-hydroxylated or ortho-carboxylated diazotization components to produce azo-dyestuffs proceeds, as is usual for pyrazolones, in an acid or an alkaline medium. As will be apparent from the foregoing formulae of the coupling components, besides the formation of the pyrazolone-azo-dyestuff a further azo-dyestuff formation may occur, for example with the residue of one of the aminophenol- or amino-hydroxynaphthalene derivatives named (see for instance Formulae 13 and 20). In this case it is possible to prepare as may be desired mixed dyestuffs in respect of the diazotization components, since, apart from the different coupling powers of the diazo components, the coupling powers of the various residues of the coupling components are also different. Thus, quite generally the diazotized ortho-aminocarboxylic acids couple more easily than the diazotized ortho-amino-hydroxy compounds and the pyrazolones more easily than the 1-hydroxy-naphthalene-3-sulfonic acid residues. Thus, by combining 1 mol of diazotized 1-amino-benzene-2-carboxylic acid in an acetic acid medium with 1 mol of the compound of the Formula 19, and then combining the mono-azo-dyestuff further in an alkaline medium with 1 mol of diazotized 1-hydroxy-2-aminobenzene-4-sulfonic acid, there is produced a dyestuff of the formula:

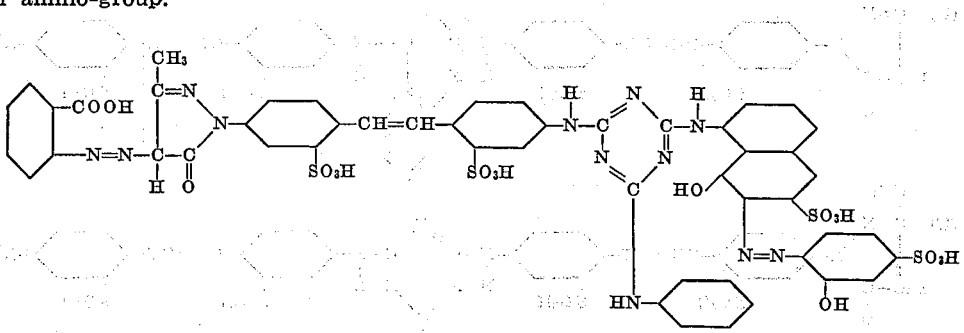

The new azo-dyestuffs have for instance the following formulas:

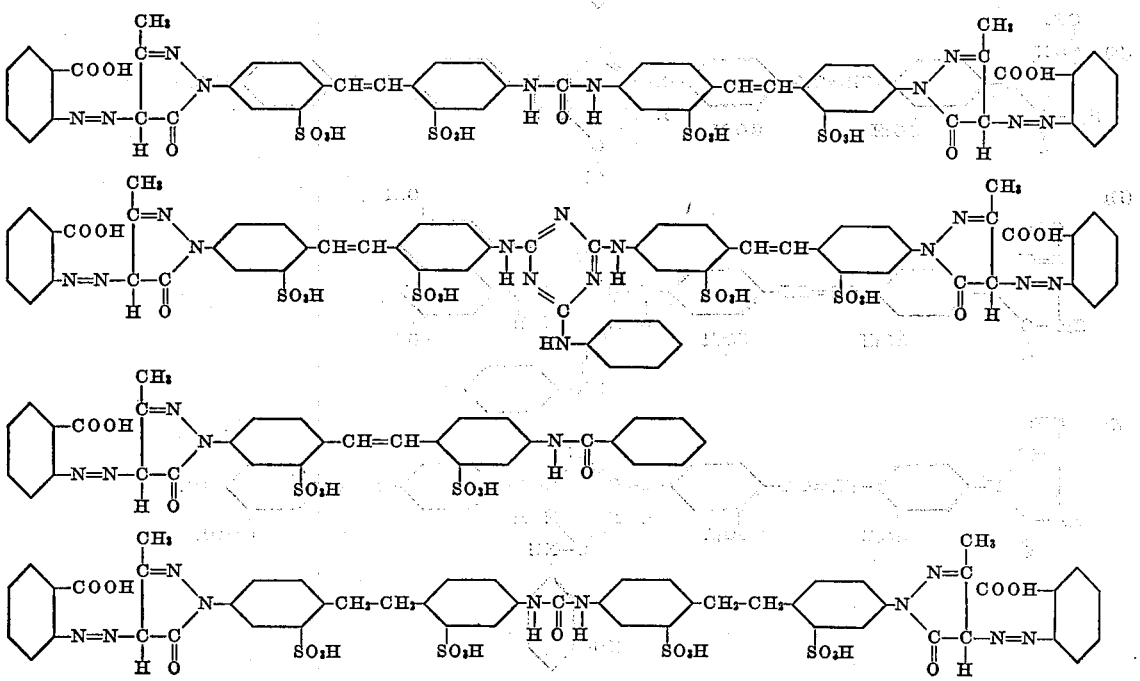

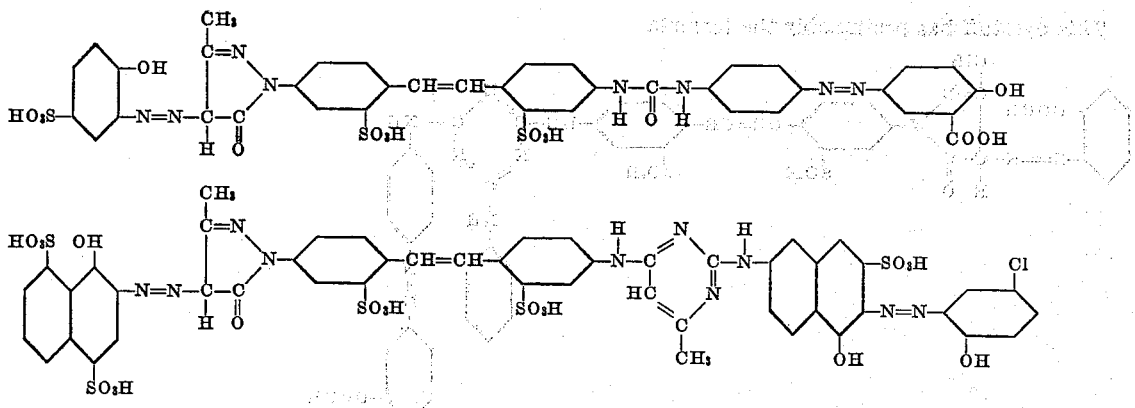

Reference must also be made to the further possibilities afforded by the diazo components hereinbefore mentioned and the formulae of the coupling components given by way of example.

The dyestuffs of the present invention are accordingly azo-dyestuffs of the general formula

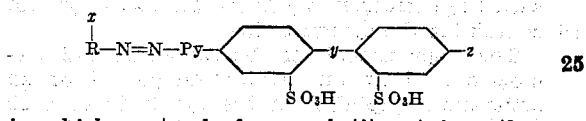

in which $x$ stands for a substituent in ortho-position to the N=N— group which is capable of forming complex compounds with metals, Py stands for the residue of a 5-pyrazolone which is combined in 1-position with the residue

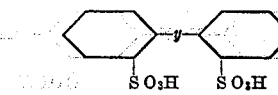

and in 4-position with the azo-residue, $y$ for a CH=CH— or a $CH_2$—$CH_2$—group and $z$ for the conversion product of a nitro-group.

The characteristic properties of the new dyestuffs are conditioned by the grouping

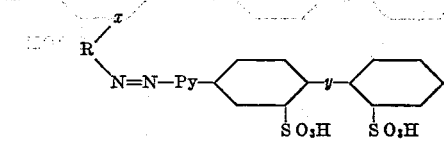

which in particular is responsible for the shade of the dyestuffs, their affinity for vegetable fibres, and the high fastness to light of the dyeings after-treated with metal, as will be evident from a comparison of the properties of the individual products described in the examples which follow.

When prepared in substance the new products constitute in the dry state yellow to brown or blackish powders which are soluble in water to yellow to orange, brown, greenish, olive and blackish solutions from which they are adsorbed by cellulose fibres yielding dyeings of similar shades if after-treated with agents yielding metal, which are distinguished by their excellent properties hereinbefore referred to. Details in respect of the manufacture of such dyestuffs and of their properties will be found in the following examples, the number of which could be multiplied as desired. The parts in the examples are by weight.

In all the examples, the formulas given represent the products in their free states.

*Example 1*

59.9 parts of the dyestuff from diazotized 1-aminobenzene-2-carboxylic acid and the 3-methyl-5-pyrazolone of the formula

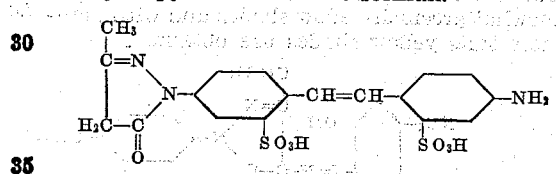

in the form of the neutral sodium salt are dissolved in about 300 parts of water, and at 0–5° C. the solution is introduced into an aqueous suspension of 18.4 parts of cyanuric chloride. When condensation is finished there is introduced into the mixture a solution of the sodium compound from 25.7 parts of 4-amino-4′-hydroxy-azobenzene-3′-carboxylic acid in about 100 parts of water. The whole is heated at 50–55° C. and the liberated acid is neutralized by the addition of sodium bicarbonate. When condensation is finished the reaction product is salted out and filtered with suction. The dyestuff of the formula

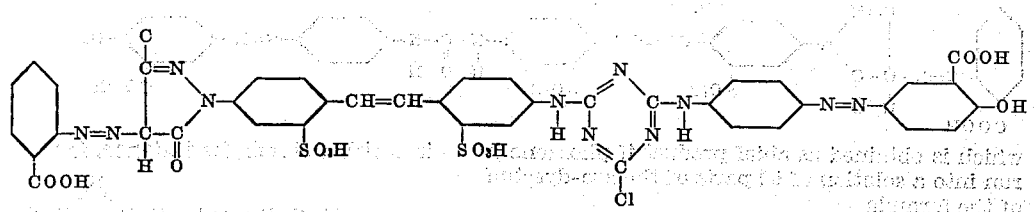

can be converted on the fibre into a metal compound; the copper compound thus formed dyes cotton or viscose rayon, for example, fast yellow shades.

The third chlorine atom of the cyanuric ring may also be exchanged. For this purpose the freshly filtered dyestuff is dissolved in about 800 parts of water and the solution is boiled for about 1 hour with 9.3 parts of aniline for replacing the remaining chlorine atom of the cyanuric residue. The excess of aniline is then expelled by steam distillation, the solution is filtered and the dyestuff is salted-out, filtered with suction and dried. The dyestuff so obtained dyes cotton powerful yellow shades.

This dyestuff has presumably the formula

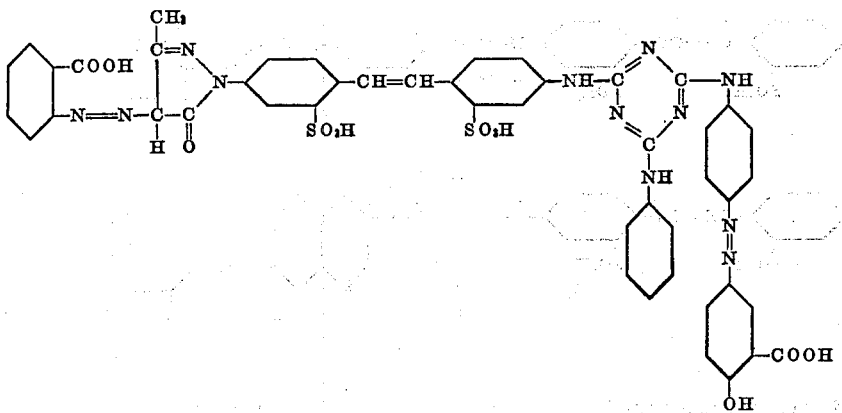

The analogous dyestuff in which the CH=CH— group is merely replaced by a CH₂—CH₂—group has similar properties.

Fast yellow shades are obtained by first dyeing the fibre with the dyestuff of the first paragraph of this example in the manner usual for direct dyestuffs and then after-coppering the dyeing or after-treating it with a nickel salt in known manner. By means of iron salts there are obtained dull yellow shades, by treatment with cobalt salts yellow shades, with chromium salts somewhat greenish-yellow shades and with manganese salts yellow shades are obtained.

3'-carboxylic acid in 400 parts of water containing 30 parts of sodium carbonate until almost no free amino-group is present, is a dyestuff whose tints are very similar to those obtained with the corresponding above-described dyestuff containing the cyanuric ring.

The replacement of 1-aminobenzene-2-carboxylic acid by an ortho-aminophenol or an ortho-aminonaphthol in the synthesis of such dyestuffs leads to compounds which dye brown shades. This is the case, for example, with the dyestuffs of the general formulae

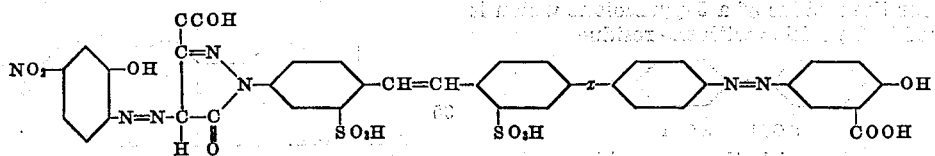

and

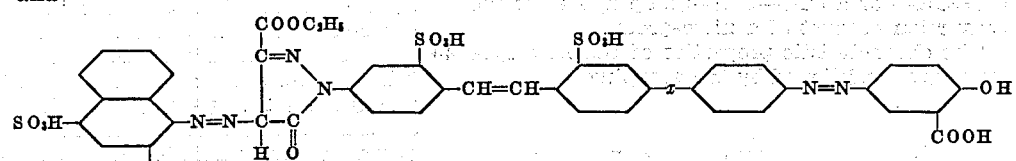

The similarly constituted dyestuff of the formula

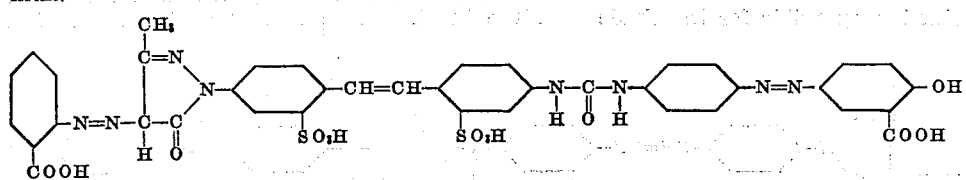

which is obtained as chief product if phosgene is run into a solution of 60 parts of the azo-dyestuff of the formula

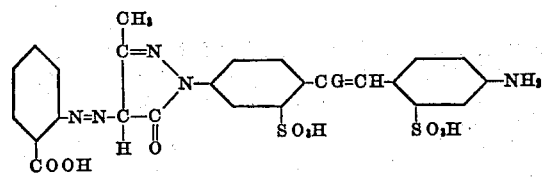

and 26 parts of 4-amino-4'-hydroxyazobenzenein which $x$ stands for instance, for

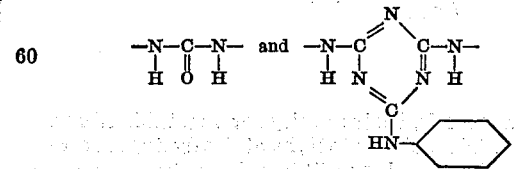

Finally, if in the first phase of this example the primary condensation product of the formula

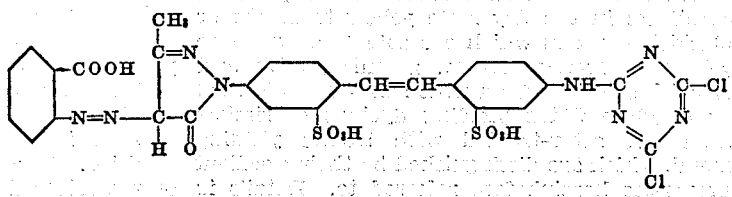

is condensed with 2 equivalent proportions of 4-amino-4'-hydroxyazobenzene-3'-carboxylic acid and the tertiary condensation product is treated with an agent yielding metal, there are again obtained dyestuffs which dye yellow shades.

*Example 2*

The primary condensation product prepared according to the first paragraph of Example 1 from 1 equivalent proportion of the dyestuff from diazotized 1-aminobenzene-2-carboxylic acid and the 1-aryl-5-pyrazolone of the formula

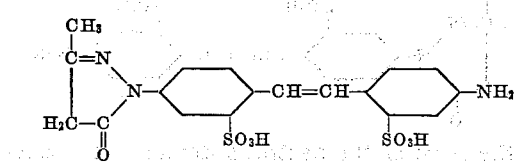

and one equivalent proportion of cyanuric chloride is condensed in an analogous manner with 27.7 parts of 4-amino-azobenzene-4'-sulfonic acid and 9.3 parts of aniline or 10.7 parts of monomethylaniline or para-toluidine. There is obtained a yellow dyestuff which dyes cotton fast shades and can be converted on the fibre into a complex copper compound in the manner already described. The replacement of the 4-amino-azobenzene-4'-sulfonic acid by the azo-dyestuff from diazotized 2-amino-naphthalene-4:8-disulfonic acid and meta-toluidine followed by diazotization and coupling with a further molecule of meta-toluidine leads to a product which constitutes a browner dyestuff, which corresponds for example to the following formula of a non-metallized dyestuff:

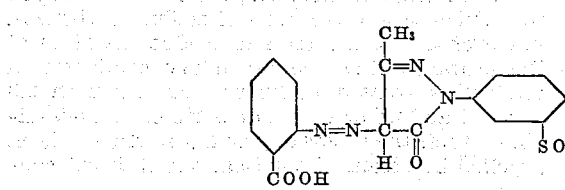

*Example 3*

45.1 parts of the 3-methyl-5-pyrazolone of the formula

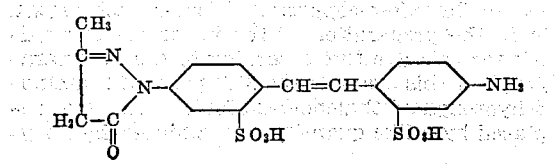

are dissolved in 500 parts of water together with the quantity of sodium carbonate required for forming the disodium salt and to the solution is added a solution of the sodium salt from 23.9 parts of 2-amino-5-hydroxynaphthalene-7-sulfonic acid. The mixture is heated to 40-50° C. and converted into the mixed urea by the introduction of phosgene.

71.6 parts of the urea thus prepared are dissolved in the form of the sodium salt in 300 parts of water, 13.6 parts of sodium acetate are added and the solution is coupled with a diazo solution from 13.7 parts of 1-aminobenzene-2-carboxylic acid. Then there are added an aqueous solution of 11 parts of sodium carbonate and a diazo solution from further 13.7 parts of 1-aminobenzene-2-carboxylic acid. When coupling is finished, the dyestuff is salted out, filtered with suction and dried. It is a yellow-brown powder which dyes cotton yellow-brown shades. By converting the dyestuff on the fibre into a copper or nickel compound there are obtained yellow-brown shades of excellent fastness to light. The dyestuff corresponds to the formula:

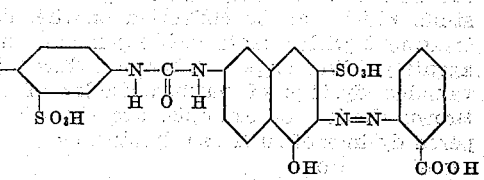

*Example 4*

71.6 parts of the mixed urea of the formula

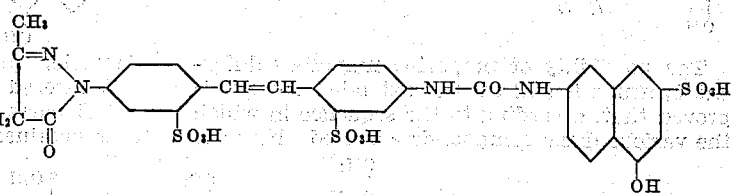

obtainable as described in the first paragraph of Example 3 are dissolved in the form of the sodium salt in about 300 parts of water, and after addition of sodium acetate the solution is combined with a diazo solution from 13.7 parts of 1-aminobenzene-2-carboxylic acid. When formation of the mono-azo-dyestuff is finished, there are added an aqueous solution of 11 parts of sodium carbonate and then slowly a diazo solution from 18.9 parts of 2-amino-1-hydroxybenzene-4-sulfonic acid. When coupling to a diazo dyestuff is finished, the dyestuff is isolated as usual. By treating on the fiber a dyeing of this dyestuff with an agent yielding metal, for example with a salt of copper or nickel, metalliferous dyestuffs are obtained which dye vegetable fibres fast shades which are yellow-brown in the case of the copper compound and orange-brown in the case of the nickel compound. The dyestuff corresponds to the formula

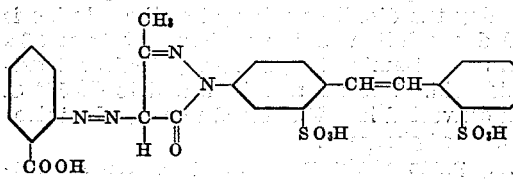

If the 3-methyl-5-pyrazolone of the stilbene series used as parent material in the first paragraph of this example is replaced by a corresponding 3-aryl-pyrazolone or 3-carboxy-pyrazolone or by corresponding 5-pyrazolones of the dibenzyl series, or if, furthermore, the 2-amino-5-hydroxynaphthalene-7-sulfonic acid used for the urea formation is replaced by another aminonaphthol, for example 2-amino-8-hydroxynaphthalene -6-sulfonic acid or 1-amino-8-hydroxy-naphthalene-3:6-disulfonic acid, and having regard to the substituted ortho-carboxylated or ortho-hydroxylated diazo compounds of the benzene and naphthalene series already specified in the introduction and in the examples. There can be prepared a large number of further dyestuffs which can be converted on the fibre by treatment with agents yielding metal, such as agents yielding copper. There are thus obtained valuable dyeings of various shades of brown. Brown shades for example, are the after-coppered dyeings of such azo-dyestuff as

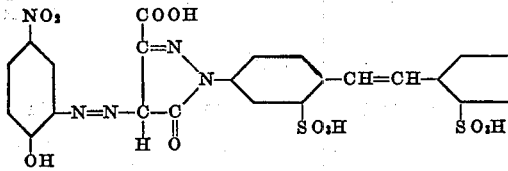

The possibility of preparing numerous different dyestuffs is still further extended, since it is proved that, according to the sequence in which the various diazo compounds are used, there are obtained, even from otherwise the same parent materials, dyestuffs which indeed have similar dyeing properties but nevertheless exhibit appreciable variations.

Example 5

45.1 parts of the 3-methyl-5-pyrazolone of the formula

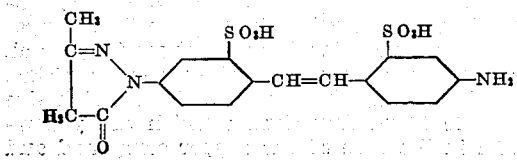

or of the formula

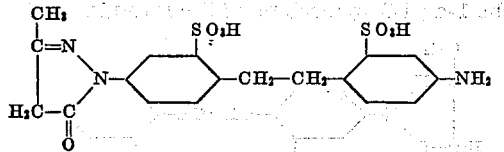

in the form of the neutral sodium salt are condensed in known manner with 48.4 parts of cyanuric chloride and the primary condensation product is combined with a solution containing 23.9 parts of 2-amino-5-hydroxynaphthalene-7-sulfonic acid in the form of the sodium salt at 40–50° C. whilst neutralizing the acid liberated in the condensation by means of sodium carbonate. For exchanging the remaining chlorine atom of the cyanuric ring the secondary condensation product is treated in known manner with 9.3 parts of aniline or with 10.7 parts of meta-toluidine. After the excess of primary amine has been expelled by steam distillation, the finished condensation product is salted out with common salt, filtered with suction and dried.

42.5 parts of a ternary condensation product thus obtained having the formula

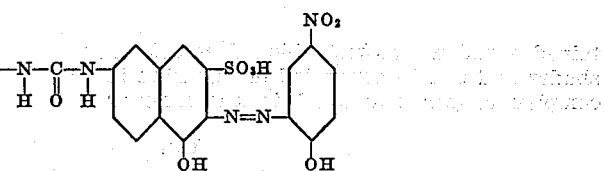

or of the formula

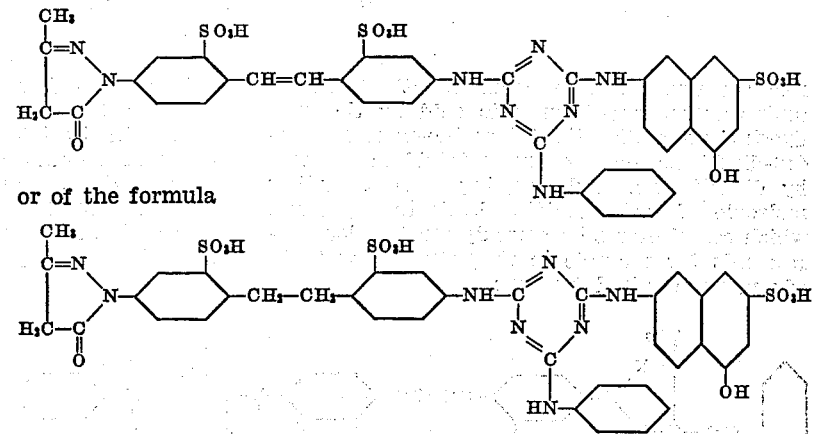

are dissolved in 200 parts of water with addition of sodium carbonate in the quantity required for forming the neutral sodium salt and the solution is then mixed with the diazo solution from 13.7 parts of 1-amino-benzene-2-carboxylic acid with the addition of dilute ammonia. There is thus formed a diazo-dyestuff which, when isolated in known manner, dyes cotton in shades which, by after-coppering, become fast brown. If in the preparation of the intermediate product for this dyestuff according to the first paragraph of this example the 23.9 parts of 2-amino-5-hydroxynaphthalene-7-sulfonic acid are replaced by a like quantity of 2-amino-8-hydroxynaphthalene-6-sulfonic acid there is obtained a dyestuff dyeing similar shades, whilst replacement of the 2-amino-5-hydroxynaphthalene-7-sulfonic acid by 31.9 parts of 1-amino-8-hydroxynaphthalene-3:6-disulfonic acid leads to a product which dyes appreciably deeper and redder shades. The formula of the dyestuff corresponding to the last named product is the following:

the filtered dyestuff is dried. The product dyes cotton yellow-brown shades.

A dyestuff giving dyeings which, when after-coppered, are yellowish-brown, is likewise obtained by combining 42.9 parts of the condensation product of the first paragraph of this example with the diazo compound from 22.3 parts

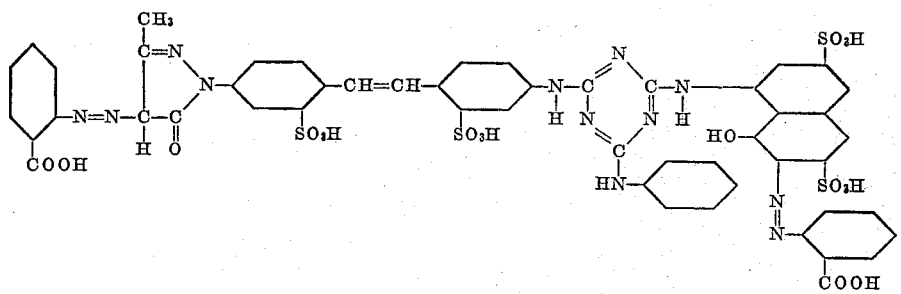

Deep brown are for example the after-coppered dyeings of the azo-dyestuff of the formula

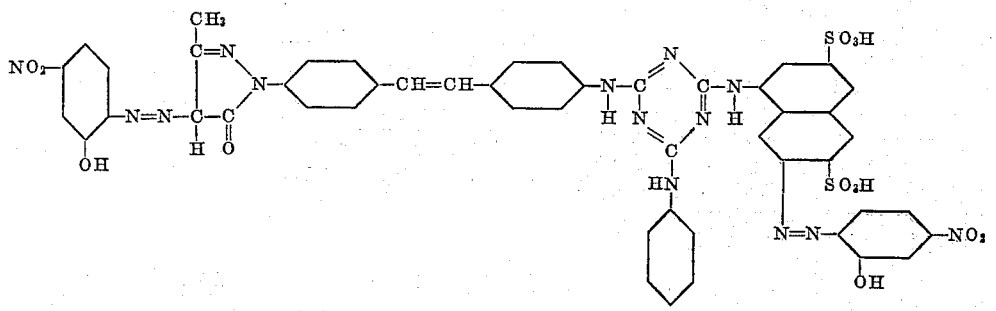

Azo-dyestuffs which dye yellow-shades can be obtained by replacing in the preparation of the intermediate product the 2-amino-5-hydroxynaphthalene-7-sulfonic acid by 1-amino-3-hydroxynaphthalene, 1-(4'-aminophenyl)-3-methyl-5-pyrazolone, 1-(3'-aminophenyl)-3-carboxy-5-pyrazolone, para-amino-aceto-acetic anilide and so on. The formula of such a dyestuff is for example:

of 2-amino-4-chloro-1-hydroxybenzene-6-sulfonic acid.

Further dyestuffs giving dyeings which, when after-coppered, are brown, are obtained by combining 1 mol of the aforesaid ternary condensation product in different orders of succession with 1 mol of a diazotized 1-aminobenzene-2-carboxylic acid, 1 mol of an ortho-hydroxy-diazo compound, for example 1-hydroxy-2-amino-4-nitro-

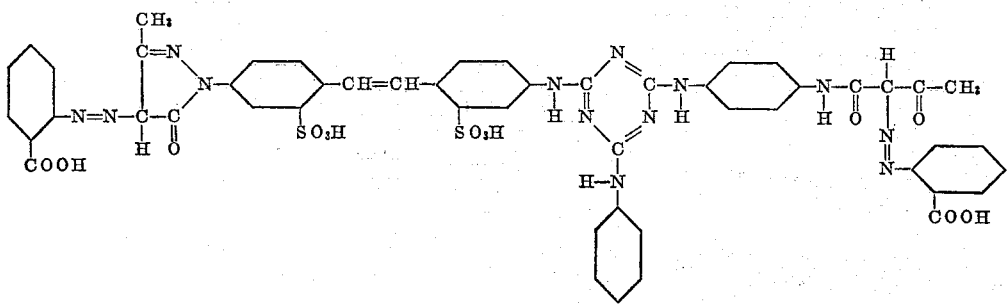

Example 5

42.9 parts of the ternary condensation product of the first paragraph of Example 5 are dissolved to a neutral solution which is mixed with a diazo solution from 6.9 parts of 1-aminobenzene-2-carboxylic acid to which sodium acetate has been added. The whole is stirred until the diazo compound has disappeared and is then rendered alkaline and mixed with the diazo compound from 9.4 parts of 1-hydroxy-2-aminobenzene-4-sulfonic acid. After this diazo compound has also disappeared, the whole is filtered and benzene or with 1 mol of a diazotized amino-azo-dyestuff, for example with the diazotized azo-dyestuff from 1 mol of diazotized 1-aminonaphthalene-3:6-disulfonic acid and 1 mol of meta-toluidine.

Quite similar dyestuffs are also obtained if in the preparation of the condensation product serving as coupling component the 18.4 parts of cyanuric chloride are replaced by 15 parts of 2:6-dichloro-4-methylpyrimidine, 19.9 parts of dichloroquinazoline or 21.4 parts of phenyldichlorotriazine.

The formulae of these dyestuffs may, for example, be:

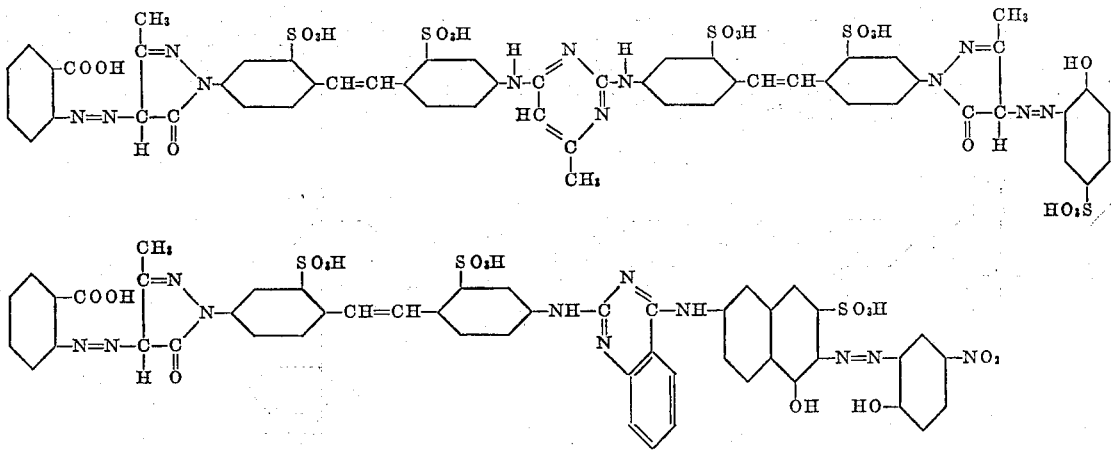

What I claim is:
1. The azo-dyestuffs having in the free state the general formula

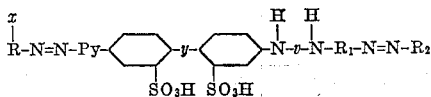

in which R stands for a nucleus of the group consisting of aromatic nuclei of the benzene and naphthalene series, $x$ stands for a lake-forming group in ortho-position to the —N=N— group, Py stands for the radical of a 5-pyrazolone which is combined in 1-position with the radical

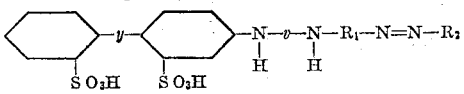

and in 4-position with the azo-group, $y$ stands for a connecting link of the group consisting of —CH=CH— and —CH$_2$—CH$_2$—, wherein the symbols R$_1$ and R$_2$ represent aromatic nuclei selected from the group consisting of aromatic nuclei of the benzene and naphthalene series, $v$ standing for a member of the group consisting of C=O and the radical of a heterocyclic six-membered ring system, whose heterocyclic six-membered ring consists of carbon and nitrogen atoms of which at least 3 and at the most 4 are carbon atoms and at least 2 and at the most 3 are nitrogen atoms, the

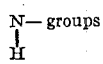 groups being linked to the carbon atoms of the

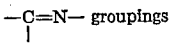 groupings of the heterocyclic ring, which products form yellow to brown powders, dissolve in water to yellow to orange, brown and olive solutions, and dye cotton yellow to orange, brown and olive tints which become faster, particularly faster to light, by after-coppering.

2. The azo-dyestuffs corresponding in the free state to the general formula

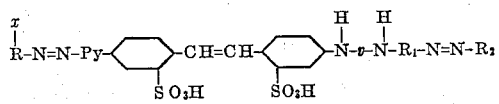

in which R stands for a nucleus of the group consisting of aromatic nuclei of the benzene and naphthalene series, $x$ stands for a lake-forming group in ortho-position to the —N=N— group, Py stands for the radical of a 5-pyrazolone which is combined in 4-position with the azo group and in 1-position with the radical

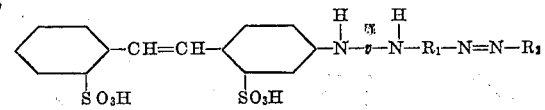

wherein the symbols R$_1$ and R$_2$ represent aromatic nuclei selected from the group consisting of the benzene and naphthalene series, $v$ standing for a member of the group consisting of

and the radical of a heterocyclic six-membered ring system, whose heterocyclic six-membered ring consists of carbon and nitrogen of which at least 3 and at the most 4 are carbon atoms and at least 2 and at the most 3 are nitrogen atoms, the

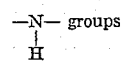 groups being linked to the carbon atom of the

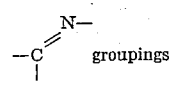 groupings of the heterocyclic ring, which products form yellow to brown powders, dissolve in water to yellow to orange, brown and olive solutions and dye cotton yellow to orange, brown and olive tints which become faster, particularly faster to light, by after-coppering.

3. The azo-dyestuffs having in the free state the general formula

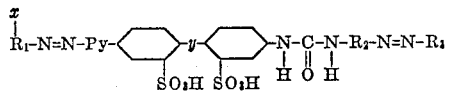

in which R$_1$ stands for a nucleus of the group consisting of nuclei of the benzene and naphthalene series, $x$ stands for a lake-forming group in ortho-position to the —N=N— group, Py stands for the radical of a 5-pyrazolone which is combined in 1-position with the radical

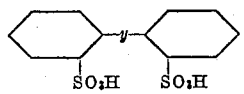

and in 4-position with the azo-group, $y$ stands for a connecting link of the group consisting of —CH=CH— and —CH$_2$—CH$_2$, and R$_2$ and R$_3$ stand for nuclei selected from the group consisting of aromatic nuclei of the benzene and naphthalene series, which products form yellow to brown powders, dissolve in water to yellow to orange, brown and olive solutions, and dye cotton yellow to orange, brown and olive tints, which become faster, particularly faster to light, by after coppering.

4. The azo-dyestuffs corresponding in the free state to the general formula

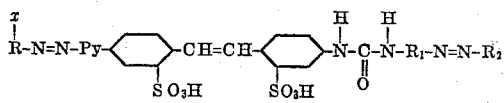

in which R stands for a nucleus of the group consisting of aromatic nuclei of the benzene and naphthalene series, $x$ stands for a lake-forming group in ortho-position to the —N=N— group, Py stands for the radical of a 5-pyrazolone which is combined in 1-position with the radical

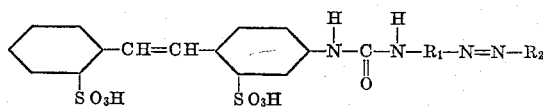

and in 4-position with the azo-group, wherein the symbols $R_1$ and $R_2$ represent aromatic nuclei selected from the group consisting of the benzene and naphthalene series which products form yellow to brown powders, dissolve in water to yellow to orange, brown and olive solutions, and dye cotton yellow to orange, brown and olive tints which become faster, particularly faster to light, by after-coppering.

5. The azo-dyestuffs having in the free state the general formula

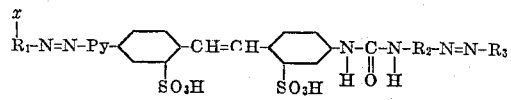

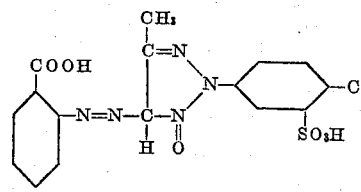

in which $R_1$ stands for a nucleus of the group consisting of nuclei of the benzene and naphthalene series, $x$ stands for a lake-forming group in ortho position to the —N=N— group, Py stands for the radical of a 5-pyrazolone which is combined in 1-position with the radical

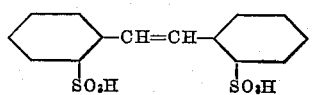

and in 4-position with the azo group and $R_2$ and $R_3$ stand for nuclei selected from the group consisting of the benzene and naphthalene series, which products form yellow to brown powders, dissolve in water to yellow to orange, brown and olive solutions, and dye cotton yellow to orange, brown and olive tints, which become faster, particularly faster to light, by after-coppering.

6. The azo-dyestuffs having in the free state the general formula

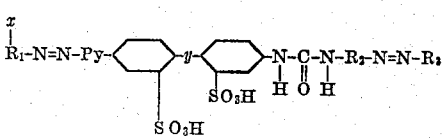

in which $R_1$ stands for a nucleus of the benzene series, $x$ stands for a lake-forming group in ortho-position to the —N=N— group, Py stands for the radical of a 5-pyrazolone which is combined in 1-position with the radical

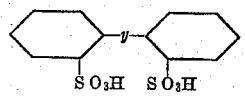

and in 4-position with the azo-group, $y$ stands for a connecting link of the group consisting of —CH=CH— and —CH$_2$—CH$_2$—, and $R_2$ and $R_3$ stand for nuclei selected from the group consisting of aromatic nuclei of the benzene and naphthalene series, which products form yellow to brown products, dissolve in water to yellow to orange, brown and olive solutions, and dye cotton yellow to orange, brown and olive tints, which become faster, particularly faster to light, by after-coppering.

7. The azo-dyestuff having in the free state the formula

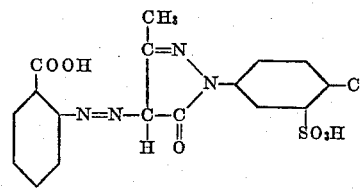

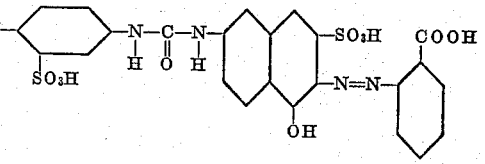

which yields on the vegetable fiber yellow-brown tints which become faster, particularly faster to light, by after-coppering.

8. The azo-dyestuff having in the free state the formula

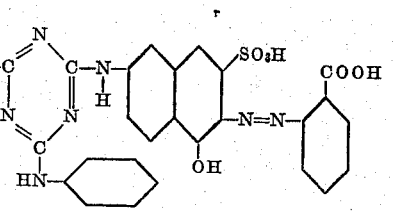

which product dyes cotton brown tints which become faster, particularly faster to light, by after-coppering.

MAX SCHMID.